United States Patent

Maxson

[11] Patent Number: 5,962,127
[45] Date of Patent: * Oct. 5, 1999

[54] PROTECTIVE COATING FOR SILICONE GELS

[75] Inventor: Myron Timothy Maxson, Sanford, Mich.

[73] Assignee: Dow Corning Corporation, Midland, Mich.

[ * ] Notice: This patent is subject to a terminal disclaimer.

[21] Appl. No.: 08/995,550

[22] Filed: Dec. 22, 1997

[51] Int. Cl.⁶ ............................ B32B 27/30; B32B 25/20
[52] U.S. Cl. .......................... 428/332; 428/334; 428/335; 428/336; 428/421; 428/422; 428/451
[58] Field of Search .............................. 524/398; 428/421, 428/422, 451, 332, 334, 335, 336

[56] References Cited

U.S. PATENT DOCUMENTS

| | | | |
|---|---|---|---|
| 4,395,462 | 7/1983 | Polmanteer | 428/420 |
| 4,465,805 | 8/1984 | Blizzard et al. | 524/765 |
| 4,719,275 | 1/1988 | Benditt et al. | 528/15 |
| 5,059,649 | 10/1991 | Maxson et al. | 524/398 |
| 5,368,315 | 11/1994 | Viksne | 277/235 A |
| 5,551,707 | 9/1996 | Pauley et al. | 277/233 |
| 5,770,298 | 6/1998 | Nakamura et al. | 428/195 |

*Primary Examiner*—D. S. Nakarani
*Attorney, Agent, or Firm*—Catherine U. Brown; Sharon K. Severance; Timothy J. Troy

[57] ABSTRACT

A silicone gel product that resists fuel adsorption and has a surface that feels smooth and dry, resists dirt and moisture pick-up, and prevents the product from sticking to itself, comprises a silicone gel with a tacky surface and a fluorocarbon elastomer film adhering to the surface of the silicone gel.

16 Claims, No Drawings

PROTECTIVE COATING FOR SILICONE GELS

BACKGROUND OF THE INVENTION

This invention relates to a curable protective coating for a silicone gel. More particularly, this invention relates to a fluorocarbon dispersion that cures to yield an elastomeric fluorocarbon coating that acts as a barrier to fuel adsorption by the silicone gel.

Commercially available silicone gels are designed to be soft, have low modulus, and have a tacky surface. Silicone gels are useful in protecting electrical and electronic devices. Exposing a silicone gel based on a polydimethylsiloxane polymer to a fuel is known in the art to cause extremely high adsorption and high volume swell.

One method of reducing fuel adsorption uses gels based on fluorosilicone polymers. For example, U.S. Pat. No. 4,719,275 issued on Jan. 13, 1988, to Benditt et al. discloses fluoroalkylpolysiloxane gels that are resistant to hydrocarbon fuels. However, these gels can still adsorb enough fuel to cause swell that will adversely affect the performance of some electronic devices. Another method of reducing fuel adsorption is by coating silicone gels with fluorosilicone elastomers. For example, U.S. Pat. No. 4,465,805 issued on Aug. 14, 1984, to Blizzard et al. discloses fluorosilicone elastomers that are resistant to hydrocarbon liquids and are useful as coatings. However, gels coated with fluorosilicone elastomers can still adsorb enough fuel to cause swell that will adversely affect electronic device performance.

U.S. Pat. 5,368,315 issued on Nov. 29, 1994, to Viksne discloses a non-stick automotive gasket comprising a resilient material with a polymeric fluorocarbon coating. The coating is obtained using a dispersion of polymeric fluorocarbon particles in a silicone fluid. The resilient material absorbs the silicone fluid, leaving a coating of polymeric fluorocarbon on the surface of the resilient material. The fluorocarbon prevents the resilient material of the gasket from sticking to engine parts and prevents liquid lubricants and coolants from leaking.

U.S. Pat. No. 5,551,707 issued on Sep. 3, 1996, to Pauley et al. discloses a composite seal that includes a layer of plastic material, such as a fluorocarbon, sandwiched between layers of elastomeric material, such as a fluorosilicone. The layers are held together by an ethylene vinyl alcohol adhesive. The fluorocarbon layer has a lower permeability to the fluid being sealed than one of the layers of fluorosilicone material.

U.S. Pat. No. 4,395,462 issued on Jul. 26, 1983, to Polmanteer discloses a fluorocarbon elastomer used as a coating for cured and peroxide-curable silicone rubber compositions. The fluorocarbon elastomer reduces gas permeability and imparts abrasion resistance to the silicone rubber substrate. However, Polmanteer does not disclose the fluorocarbon elastomer as a coating for silicone gels; and furthermore, Polmanteer does not disclose use of the fluorocarbon elastomer to reduce swelling of the substrate on which it is coated in the presence of a fuel.

One object of the present invention is to provide a silicone gel product comprising a silicone gel with a fluorocarbon elastomer on the surface thereof. The fluorocarbon elastomer reduces swelling of the silicone gel in the presence of a fuel. A further object of the present invention is to provide a method of producing the silicone gel product.

SUMMARY OF THE INVENTION

This invention pertains to a silicone gel product that resists fuel adsorption. The silicone gel product has a surface that feels smooth and dry, resists dirt and moisture pick-up, and does not stick to itself. The silicone gel product comprises a silicone gel and a fluorocarbon elastomer adhering to the surface of the silicone gel. Preferably, the silicone gel is a fluorinated organosilicone gel produced by the addition reaction of silicon-bonded hydrogen to aliphatic unsaturation. A method for preparing the silicone gel product is also disclosed.

THE INVENTION

This invention pertains to a silicone gel product that resists fuel adsorption and has a surface that feels smooth and dry, resists dirt and moisture pick-up, and does not stick to itself, wherein the silicone gel product comprises:

A) a silicone gel selected from the group consisting of organosilicone and halogenated organosilicone gels, wherein the gel has a tacky surface and B) a fluorocarbon elastomer film adhering to the surface of the silicone gel.

Component A is any known organosilicone or halogenated organosilicone gel. The silicon-bonded organic groups on component A are, for example, alkyl such as methyl, ethyl, propyl, butyl, pentyl, and hexyl; cycloalkyl groups such as cyclopentyl and cyclohexyl; aryl such as phenyl, tolyl, xylyl, and naphthyl; and aralkyl such as benzyl and phenethyl. On component A, the halogenated organic groups are, for example, chloromethyl, 1,3-chloropropyl, and 3,3,3-trifluoropropyl. Component A has a tacky surface. Tacky is defined as tendency of the gel surface to stick or adhere to any substrate it contacts. Component A is preferably a fluorinated organosilicone gel or a dimethylsilicone gel.

Component A may be prepared by curing any known silicone gel composition. For example, compositions that cure by exposure to radiation, addition reaction of a silicon-bonded hydrogen atom to aliphatic unsaturation, condensation reaction, and others are suitable for use in the present invention. The silicone gel composition preferably is prepared by the addition reaction of a silicone gel composition.

Preferred addition reaction curing silicone gel compositions comprise:

A1) an organopolysiloxane with at least 2 alkenyl groups per molecule,

A2) an organohydrogensiloxane with at least 2 silicon-bonded hydrogen atoms per molecule, A3) a platinum catalyst, A4) an optional platinum catalyst inhibitor, A5) an optional thermal stabilizer, A6) an optional crosslinker, and A7) an optional dye.

Ingredient A1 is an organopolysiloxane with at least two alkenyl groups per molecule. At least two alkenyl groups per molecule are needed for the organopolysiloxane to properly crosslink. Ingredient A1 preferably has the general formula

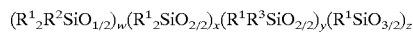

wherein each instance of $R^1$ is independently selected from monovalent hydrocarbon groups. $R^1$ is exemplified by alkyl such as methyl, ethyl, propyl, butyl, pentyl, and hexyl; cycloalkyl such as cyclopentyl and cyclohexyl; aryl such as phenyl, tolyl, xylyl, and naphthyl; and aralkyl such as benzyl and phenethyl. $R^1$ preferably has 1 to about 10 carbon atoms. Methyl and phenyl are preferred, with methyl being most preferred.

Each $R^2$ is independently selected from alkenyl groups such as vinyl, allyl, butenyl and hexenyl. $R^2$ preferably contains 2 to about 10 carbon atoms. Vinyl groups are most preferred. The alkenyl groups may be located at the chain terminals or in pendant positions, or both. The alkenyl groups are preferably located at the chain terminals.

Each $R^3$ is independently selected from $R^1$ and monovalent halogenated hydrocarbon groups. The monovalent halogenated hydrocarbon groups are exemplified by chloromethyl, 1,3-chloropropyl and 3,3,3-trifluoropropyl, with 3,3,3-trifluoropropyl being preferred.

In organopolysiloxane A1, w represents an integer $\geq 22$, x represents an integer of 0 to 300, y represents an integer of 0 to 250, and z represents an integer of 0 to 25. Preferably, w is 2 to 6, x is 8 to 20, y is 50 to 100, and z is 4 to 8.

Ingredient A1 represents 34.5 to 64.5 weight percent of the total amount of the silicone gel composition. More preferably, ingredient A1 represents 40 to 60 weight percent, and most preferably, ingredient 1 represents 45 to 55 weight percent.

Ingredient A2 is an organohydrogenpolysiloxane. At least two silicon-bonded hydrogen atoms per molecule are needed for the composition to properly crosslink. The silicon-bonded hydrogen atoms may be located at the molecular chain terminals, in pendant positions, or both. The hydrogen atoms are preferably located at the molecular chain terminals.

Ingredient A2 preferably has the general formula $(R^4{}_3SiO_{1/2})_e(R^1{}_2SiO_{2/2})_f(R^3{}_2SiO_{2/2})_g$ wherein each instance of $R^4$ is independently selected from hydrogen and $R^1$ defined above. In organohydrogensiloxane A2, e represents an integer >2, f represents an integer of 0 to 50, and g represents an integer of 3 to 150.

Ingredient A2 represents 34.5 to 64.5 weight percent of the total amount of the silicone gel composition. More preferably, ingredient A2 represents 40 to 60 weight percent, and most preferably, ingredient A2 represents 45 to 55 weight percent. When the amount of ingredient A2 is less than 34.5 weight percent, the silicone gel composition can have unsatisfactory cure.

Ingredient A3 is a platinum catalyst. Ingredient A3 may be any known platinum hydrosilylation catalyst. Ingredient A3 is exemplified by chloroplatinic acid, alcohol solutions of chloroplatinic acid, complexes of platinum compounds with unsaturated organic compounds such as olefins, and complexes of platinum compounds with organosiloxanes containing unsaturated hydrocarbon groups, where these complexes of platinum with organosiloxanes can be embedded in organosiloxane resins. Ingredient A3 is preferably a complex of platinum with an organosiloxane or such complex embedded in an organosiloxane resin. Ingredient A3 most preferably is a complex of platinum with 1,3-diethenyl-1,1,3,3-tetramethyldisiloxane or such complex embedded in an organosiloxane resin with methyl and phenyl functional groups. Ingredient A3 is added in an amount such that component A contains 3 to 10 ppm by weight of platinum, preferably 3 to 5 ppm.

Ingredient A4 is an optional platinum catalyst inhibitor used to obtain a longer working time at low temperatures before the silicone gel composition begins to cure. Ingredient A4 is preferably an acetylenic alcohol such as methylbutynol or ethynyl cyclohexanol. Ingredient A4 is more preferably ethynyl cyclohexanol. Ingredient A4 represents 0.0001 to 0.05 weight percent of the total amount of the silicone gel composition. Ingredient A4 preferably represents 0.0005 to 0.01 weight percent of the total amount of the silicone gel composition. Ingredient A4 more preferably represents 0.001 to 0.004 weight percent of the total amount of the silicone gel composition.

Ingredient A5 is an optional thermal stabilizer for the silicone gel. Ingredient A5 is preferably selected from metal diketonates. Ingredient A5 is exemplified by acetyl acetonates such as aluminum acetylacetonate and copper(II) acetylacetonate. Ingredient A5 is preferably copper(II) acetylacetonate. Ingredient A5 represents 0.007 to 0.069, preferably 0.008 to 0.052, and more preferably 0.008 to 0.035 weight percent of the total amount of the silicone gel composition.

Ingredient A6 is an optional crosslinker. Ingredient A6 preferably has the general formula $(R^4{}_3SiO_{1/2})_h(R^5SiO_{3/2})_j$, wherein $R^4$ is as defined above and each $R^5$ is independently selected monovalent halogenated hydrocarbon groups such as chloromethyl, 1,3-chloropropyl and 3,3,3-trifluoropropyl, with 3,3,3-trifluoropropyl being preferred. Subscript h represents an integer in the range of 3 to 5 and j represents an integer in the range of 1 to 3. Ingredient A6 is represents 0.1 to 0.5 weight percent of the composition.

Ingredient A7 in the preferred embodiment of the invention is an optional ultra-violet dye. Ingredient A7 is typically used at 0.0005 to 0.005 weight percent of the composition. Ingredient A7 is preferably (thiophenediyl)bis(t-butylbenzoxazole).

Component A can be prepared by mixing ingredients A 1–A7 for 15 minutes to 4 hours at room temperature of about 25° C. Component A will cure by heating the mixture at a temperature up to 150° C.

Component B of the present invention is a fluorocarbon elastomer film adhered to the surface of the silicone gel. Component B has film thickness in the range of 0.01 to 5 millimeters, preferably 0.1 to 0.5 millimeters. The weight ratio of Component B to Component A will vary depending on the geometry of the sample. However, the weight ratio of component B to component A is typically in the range of 1 to 50, preferably in the range of 1 to 20.

The fluorocarbon elastomer is prepared by curing a fluorocarbon dispersion comprising:

B1) a fluorocarbon polymer,

B2) a curing agent, and

B3) a solvent.

The fluorocarbon dispersion has viscosity in the range of 100 to 5000 mPa.s at 25° C.; preferably in the range of 300 to 1000 mPa.s at 25° C. The fluorocarbon dispersion cures to tack free in less than 60 minutes at 23° C.

Ingredient B1 is a fluorocarbon polymer. Examples of suitable fluorocarbon polymers include polymers of 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and perfluoro(methyl vinyl ether); vinylidene fluoride and perfluoro(methyl vinyl ether); tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. The amount of ingredient B1 is preferably in the range of 5 to 50 weight parts, more preferably in the range of 15 to 30 weight parts.

Ingredient B2 is a curing agent. The amount of ingredient B2 is preferably in the range of 1 to 10 weight parts, more preferably in the range of 2 to 6 weight parts. Suitable curing agents are exemplified by, but not limited to, peroxide, diamine, and bisphenol-onium curing agents.

Ingredient B3 is a solvent, preferably a polar solvent. Examples of preferred polar solvents include acetone, methylethyl ketone, methyl isobutyl ketone, and mixtures thereof. Ingredient B3 is typically present in an amount ranging from 50 to 95 weight parts of Component B.

Fluorocarbon dispersions useful herein are known in the art and are commercially available. In the preferred embodiment of the invention, Component B is prepared by curing a fluorocarbon dispersion such as Fluorolast LC-8125™ produced by Lauren Manufacturing Co. or PLV 2038™ produced by Pelmor Laboratories, Inc.

This invention also pertains to method of preparing a silicone gel product that resists fuel adsorption and has a surface that feels smooth and dry, resists dirt and moisture pick-up, and does not stick to itself. The method comprises applying a curable fluorocarbon dispersion to the surface of a silicone gel and curing the fluorocarbon dispersion to form a fluorocarbon elastomer film adhering to the surface of the silicone gel.

The silicone gel may be obtained from a curable silicone gel composition that cures by any mechanism known in the art. For example, cure by exposure to radiation, addition reaction of a silicon-bonded hydrogen atom to aliphatic unsaturation, condensation reaction, and others are suitable. The silicone gel is preferably cured by addition reaction.

The fluorocarbon dispersion is applied to the silicone gel by methods such as coating, drop coating, dipping, spraying, and brushing. Application is carried out at normal room temperature of about 23° C. The fluorocarbon dispersion has good wet out-forming a continuous film on the surface of the silicone gel.

When the dispersion is cured, it forms a fluorocarbon elastomer film that adheres to the silicone gel. To cure the fluorocarbon dispersion, first the solvent may be allowed to evaporate out of the fluorocarbon dispersion at a temperature that will not cure the fluorocarbon polymer and that will not cause the solvent to boil, which would make bubbles in the fluorocarbon film. The temperature chosen will vary depending on the fluorocarbon polymer, curing agent, and solvent in the fluorocarbon dispersion. However, the temperature is typically 0 to 50° C. Subsequently, the fluorocarbon polymer is heated to a temperature of greater than 50 to 125° C. to cure.

However, in a preferred alternative embodiment of the invention, the fluorocarbon dispersion cures by concurrent solvent evaporation and reaction of the fluorocarbon polymer and curing agent at a temperature ranging from 0 to 50° C., more preferably 0 to 25° C. Tack free times can be as short as 20 minutes, but complete cure may take up to 5 days, depending on the coating thickness.

EXAMPLES

These examples are intended to illustrate the invention to those skilled in the art and should not be interpreted as limiting the scope of the invention set forth in the claims.

Reference Example 1

A fluorosilicone gel was prepared by mixing for 15 minutes and then curing the following composition:

49.53 weight parts of dimethylvinylsiloxy-terminated, dimethyl, trifluoropropylmethyl siloxane with methyl silsesquioxanes;

49.53 weight parts of dimethylhydrogensiloxy-terminated, dimethyl, trifluoropropylmethyl siloxane;

0.495 weight parts of a complex of platinum with 1,3-diethenyl-1,1,3,3-tetramethyldisiloxane embedded in an organosiloxane resin with methyl and phenyl functional groups;

0.001 weight parts of ethynyl cyclohexanol;

0.00037 weight parts of copper(II) acetylacetonate;

0.396 weight parts of dimethylhydrogensiloxy-terminated, trifluoropropyl silsesquioxane; and 0.0005 weight parts of (thiophenediyl)bis(t-butylbenzoxazole).

The silicone gel composition cured by heating at 150° C. for 60 minutes.

Example 1

Sample 1 was prepared by drop coating a curable fluorocarbon dispersion, Fluorolast LC-8125™, on the surface of 5.0 g of the silicone gel prepared in Reference Example 1. The dispersion was cured at 23° C. for 5 days. Sample 1 had 0.31 g of fluorocarbon elastomer adhering to its surface after cure. The thickness of the fluorocarbon elastomer film on Sample 1 was 0.26 millimeters. Thickness was calculated based on the surface area of the sample and the specific gravity of the fluorocarbon elastomer.

Sample 1 was then immersed in ASTM Reference Fuel C at 23° C. The fuel adsorption was measured as per cent weight gain over time. The results are reported in Table 1. As shown by the results in Table 1, the silicone gel product of the present invention adsorbs fuel at a slower rate and in a lower amount than an uncoated gel and a gel with a fluorosilicone elastomer film coated on its surface.

Comparison Example 1

Comparison Sample 1 was 5.0 g of the silicone gel prepared in Reference Example 1. Comparison Sample 1 was not coated; it was immersed in ASTM Reference Fuel C at 23° C. ASTM Reference Fuel C is a mixture of 50 volume % isooctane and 50 volume % toluene. The fuel adsorption was measured as per cent weight gain over time. The results are reported in Table 1

Comparison Example 2

Comparison Sample 2 was prepared by drop coating a fluorosilicone elastomer composition on the surface of 5.0g of the silicone gel prepared in Reference Example 1. The fluorosilicone elastomer composition was cured by condensation reaction at 23° C. for 5 days. Comparison Sample 2 had 0.35 g of fluorosilicone elastomer coated on its surface after cure. The thickness of the fluorosilicone elastomer on sample 2 was 0.4 millimeters.

Comparison Sample 2 was then immersed in ASTM Reference Fuel C at 23° C. The fuel adsorption was measured as per cent weight gain over time. The results are reported in Table 1.

Reference Example 2

A dimethylsilicone gel was prepared mixing equal weights of parts I and II together and then heating to 1 50° C. for 1 hour to cure. Part I contains the following ingredients: 19.65 weight parts trimethylsiloxy-terminated dimethylsiloxane, 80 weight parts dimethylvinylsiloxy-terminated dimethylsiloxane, and 0.35 weight parts of a complex of platinum with 1,3-diethenyl-1,1,3,3-tetramethyldisiloxane.

Part II contains the following ingredients:
80 weight parts dimethylvinylsiloxy-terminated dimethylsiloxane,
18.4 weight parts trimethylsiloxy-terminated dimethylsiloxane,
1.6 weight parts dimethyl, methylhydrogen siloxane, and
0.005 weight parts ultra-violet dye.

Example 2

Sample 2 was a 5.0 g sample of the gel prepared in Reference Example 2, with Fluorolast LC-8125™ applied to its surface by drop coating. After curing the Fluorolast LC-8125™ at 23° C. for 5 days, Sample 2 had 0.25 g of fluorocarbon elastomer coated on its surface.

Sample 2 was then immersed in ASTM Reference Fuel C at 21° C. Per cent weight gain over time was measured. The results are in Table 2. As shown by the results in Table 2, the fluorocarbon elastomer coating of the present invention causes dimethylsilicone gels to adsorb fuel at a slower rate and in a lower amount than an uncoated dimethylsilicone gel.

Comparison Example 3

Comparison Sample 3 was an uncoated sample of 4.5 g of the gel prepared in Reference Example 2. Comparison Sample 3 was immersed in ASTM Reference Fuel C at 21° C. Per cent weight gain over time was measured. The results are in Table 2.

TABLE 1

| Exposure Time | % Weight Gain | | |
|---|---|---|---|
| | Comparison Sample 1 | Sample 1 | Comparison Sample 2 |
| 2 Hours | | | 2.49 |
| 5.5 Hours | 9.232 | 1.06 | |
| 21 Hours | 15.85 | 1.54 | |
| 24 Hours | | | 8.25 |
| 48 Hours | 22.9 | 1.79 | 11.70 |
| 3 Days | 26.6 | 2.20 | |
| 5 Days | | | 18.70 |
| 6 Days | 31.4 | 2.42 | |
| 9 Days | | | 24.60 |
| 10 Days | 32.4 | 3.28 | |
| 17 Days | 30.5 | 4.24 | 28.85 |
| 55 Days | 26.98 | 5.32 | 31.69 |

TABLE 2

| | % Weight Gain | |
|---|---|---|
| Exposure Time | Sample 2 | Comparison Sample 3 |
| 0.5 Hour | 0.56 | 19.2 |
| 1 Hour | 0.62 | 27.6 |
| 3 Hours | 0.77 | 47.1 |
| 20 Hours | 2.08 | 174.2 |
| 48 Hours | 5.52 | Degraded |

We claim:

1. A silicone gel product comprising:
A) a silicone gel selected from the group consisting of organosilicone and halogenated organosilicone gels, wherein the silicone gel has a tacky surface and
B) a fluorocarbon elastomer film adhered to the surface of the silicone gel.

2. The product of claim 1, wherein component A is a silicone gel prepared by curing a composition comprising:

A1) 34.5 to 64.5 weight percent of an organopolysiloxane with a general formula $(R^1_2R^2SiO_{1/2})_w(R^1_2SiO_{2/2})_x(R^1R^3SiO_{2/2})_y(R^1SiO_{3/2})_z$, A2) 34.5 to 64.5 weight percent of an organohydrogensiloxane with a general formula $(R^4_3SiO_{1/2})_e(R^1_2SiO_{2/2})_f(R^3_2SiO_{2/2})_g$, A3) an amount of a platinum catalyst sufficient to provide 3 to 10 ppm by weight of platinum in the composition, wherein each $R^1$ is independently selected from monovalent hydrocarbon groups, each $R^2$ is independently selected from alkenyl groups, each $R^3$ is independently selected from $R^1$ and monovalent halogenated hydrocarbon groups, each $R^4$ is independently selected from hydrogen and $R^1$, w represents an integer $\geq 2$, e represents an integer $\geq 2$, f represents an integer of 0 to 50, g represents an integer of 3 to 150, x represents an integer of 0 to 300, y represents an integer of 0 to 250, and z represents an integer of 0 to 25.

3. The product of claim 2, wherein the platinum catalyst is selected from the group consisting of complexes of platinum with an organosiloxane and complexes of platinum with an organosiloxane embedded in an organosiloxane resin.

4. The product of claim 2, further comprising 0.0001 to 0.05 weight percent of a platinum catalyst inhibitor.

5. The product of claim 4, wherein the platinum catalyst inhibitor is an acetylenic alcohol.

6. The product of claim 2, further comprising 0.007 to 0.069 weight percent of a thermal stabilizer.

7. The product of claim 6, wherein the thermal stabilizer is an acetyl acetonate.

8. The product of claim 2, further comprising 0.1 to 0.5 weight percent of a crosslinker.

9. The product of claim 8, wherein the crosslinker has a general formula $(R^4_3SiO_{1/2})_h(R^5SiO_{3/2})_j$ wherein each $R^5$ is independently selected from monovalent halogenated hydrocarbon groups, subscript h represents an integer in the range of 3 to 5 and j represents an integer in the range of 1 to 3.

10. The product of claim 2, further comprising 0.0005 to 0.005 weight percent of an ultra-violet dye.

11. The product of claim 1, wherein component A is a fluorosilicone gel.

12. The product of claim 11, wherein component A is a fluorosilicone gel and component B has a thickness of 0.26 millimeters.

13. The product of claim 21, wherein ingredient A1) is a dimethylvinylsiloxy-terminated, dimethyl, trifluoropropylmethyl siloxane with methylsilsesquioxanes; ingredient A2) is a dimethylhydrogensiloxy-terminated, dimethyl, trifluoropropylmethyl siloxane; ingredient A3) is a complex of platinum with 1,3-diethenyl-1,1,3,3-tetramethyldisloxane embedded in an organosiloxane resin with methyl and phenyl functional groups; ingredient A4) is ethynyl cyclohexanol; ingredient A5) is copper(II) acetylacetonate; ingredient A6) is of dimethylhydrogensiloxy-terminated, trifluoropropyl silsesquioxane; and ingredient A7) is (thiophenediyl)bis(t-butylbenzoxazole).

14. The product of claim 1, wherein component A is a dimethylisilicone gel.

15. The product of claim 1, wherein the film of component B has a thickness of 0.01 to 5 millimeters.

16. The product of claim 13, wherein the film of component B has a thickness of 0.1 to 0.5 millimeters.

* * * * *